United States Patent
Huang et al.

(10) Patent No.: US 9,918,203 B2
(45) Date of Patent: Mar. 13, 2018

(54) CORRECTING IN-VENUE LOCATION ESTIMATION USING STRUCTURAL INFORMATION

(71) Applicant: Apple Inc., Cupertino, CA (US)

(72) Inventors: Joseph Ding-Jiu Huang, Kingston (CA); Darin Tay, Sunnyvale, CA (US); Robert Mayor, Half Moon Bay, CA (US); David Benjamin Millman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/866,424

(22) Filed: Sep. 25, 2015

(65) Prior Publication Data

US 2016/0360380 A1    Dec. 8, 2016

Related U.S. Application Data

(60) Provisional application No. 62/172,014, filed on Jun. 5, 2015.

(51) Int. Cl.
*H04W 24/00* (2009.01)
*H04W 4/04* (2009.01)
*H04W 64/00* (2009.01)

(52) U.S. Cl.
CPC .......... *H04W 4/043* (2013.01); *H04W 24/00* (2013.01); *H04W 64/006* (2013.01)

(58) Field of Classification Search
CPC ....... H04W 4/043; H04W 64/00; H04W 4/04; H04W 4/02; H04W 64/006; H04W 24/00
USPC .................... 455/456.1–456.3, 457
See application file for complete search history.

(56) References Cited

U.S. PATENT DOCUMENTS

| | | | |
|---|---|---|---|
| 7,397,424 B2 | 7/2008 | Houri | |
| 7,856,234 B2 | 12/2010 | Alizadeh-Shabdiz et al. | |
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,340,691 B1 * | 12/2012 | Starenky | G01C 21/28 455/404.2 |
| 8,369,264 B2 | 2/2013 | Brachet et al. | |
| 8,478,297 B2 | 7/2013 | Morgan et al. | |
| 8,694,366 B2 | 4/2014 | Barnes, Jr. | |
| 8,775,065 B2 | 7/2014 | Gupta et al. | |
| 8,836,580 B2 | 9/2014 | Mendelson | |

(Continued)

FOREIGN PATENT DOCUMENTS

WO    WO 2016206717    12/2016

*Primary Examiner* — Mong-Thuy Tran
(74) *Attorney, Agent, or Firm* — Fish & Richardson P.C.

(57) ABSTRACT

Methods, systems, and computer program products for correcting in-venue location estimation using structural information are described. A mobile device can use wireless location technologies and dead reckoning to determine an estimated location of the mobile device in a venue. The mobile device can compare the estimated location with a map of the venue. Upon determining that the estimated location conflicts with a structural constraint, the mobile device can adjust the location estimation using the structural information. Adjusting the location estimation can include adjusting a statistical filter that provides estimation of the location and changing a heading of the mobile device used in the dead reckoning.

16 Claims, 12 Drawing Sheets

(56) References Cited

U.S. PATENT DOCUMENTS

| | | |
|---|---|---|
| 8,866,673 B2 | 10/2014 | Mendelson |
| 8,896,485 B2 | 11/2014 | Mendelson |
| 8,941,485 B1 | 1/2015 | Mendelson |
| 8,983,493 B2 | 3/2015 | Brachet et al. |
| 9,020,687 B2 | 4/2015 | Mendelson |
| 9,148,764 B2 | 9/2015 | Das et al. |
| 9,204,251 B1 | 12/2015 | Mendelson |
| 9,204,257 B1 | 12/2015 | Mendelson |
| 9,304,970 B2 | 4/2016 | Wirola et al. |
| 9,432,813 B2 | 8/2016 | Ahn et al. |
| 9,584,981 B2 | 2/2017 | Noorshams et al. |
| 9,641,814 B2 | 5/2017 | Wirola et al. |
| 2007/0001904 A1* | 1/2007 | Mendelson ............ G01C 21/206 342/450 |
| 2008/0077326 A1* | 3/2008 | Funk ..................... G01C 21/165 701/500 |
| 2012/0064855 A1 | 3/2012 | Mendelson |
| 2012/0143495 A1* | 6/2012 | Dantu .................. G01C 21/206 701/428 |
| 2012/0203453 A1* | 8/2012 | Lundquist ............ G01C 21/005 701/434 |
| 2012/0245839 A1* | 9/2012 | Syed ..................... G01C 21/165 701/408 |
| 2013/0150076 A1* | 6/2013 | Kim ....................... H04W 24/00 455/456.1 |
| 2013/0151139 A1* | 6/2013 | Park ........................ G01C 21/16 701/410 |
| 2013/0179075 A1* | 7/2013 | Haverinen ............. G01C 21/08 701/525 |
| 2014/0073345 A1* | 3/2014 | Chintalapudi ....... G01C 21/165 455/456.1 |
| 2014/0107918 A1* | 4/2014 | Friedler ................. G01C 21/20 701/445 |
| 2014/0128100 A1 | 5/2014 | Sridhara et al. |
| 2014/0162693 A1* | 6/2014 | Wachter ................ H04W 4/021 455/456.3 |
| 2014/0171098 A1* | 6/2014 | Marti .................... G01S 5/0252 455/456.1 |
| 2014/0171114 A1* | 6/2014 | Marti ..................... G01C 21/10 455/456.2 |
| 2014/0213294 A1* | 7/2014 | Marti .................... G01S 5/0252 455/456.2 |
| 2014/0213298 A1* | 7/2014 | Marti .................... G01S 5/0252 455/456.3 |
| 2014/0274136 A1 | 9/2014 | Edge et al. |
| 2014/0324590 A1* | 10/2014 | Kong ................. G06Q 30/0261 705/14.58 |
| 2014/0335893 A1* | 11/2014 | Ronen .................. G01S 5/0252 455/456.1 |
| 2014/0335900 A1 | 11/2014 | Farris |
| 2014/0361927 A1 | 12/2014 | Jarvis et al. |
| 2015/0052460 A1 | 2/2015 | Mohammad Mirzaei et al. |
| 2015/0195682 A1* | 7/2015 | Lee .......................... H04W 4/04 455/456.1 |
| 2015/0245180 A1 | 8/2015 | Lin et al. |
| 2015/0281910 A1* | 10/2015 | Choudhury ............. G01S 5/021 455/456.1 |
| 2015/0296342 A1* | 10/2015 | Boukallel ............ G01C 21/206 455/456.1 |
| 2016/0178726 A1 | 6/2016 | Wirola et al. |
| 2017/0134910 A1 | 5/2017 | Gu et al. |

\* cited by examiner

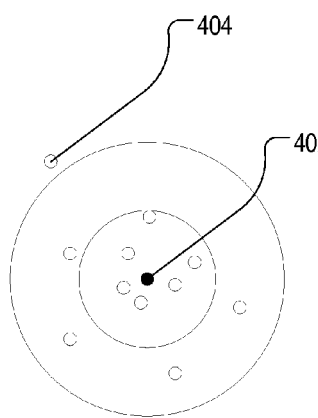
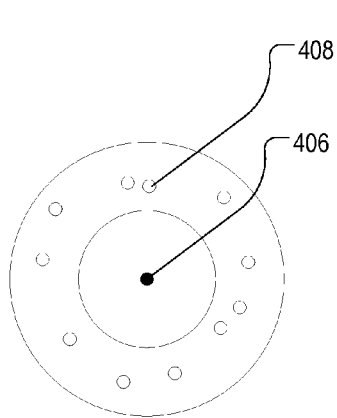
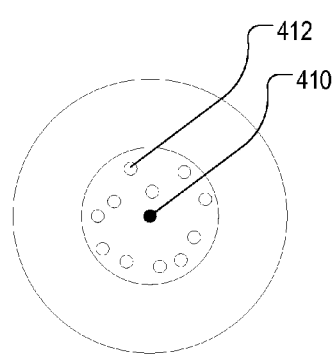
FIG. 4A  FIG. 4B  FIG. 4C
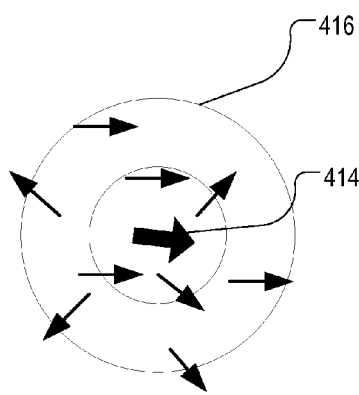
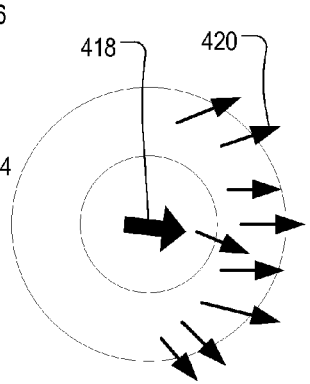
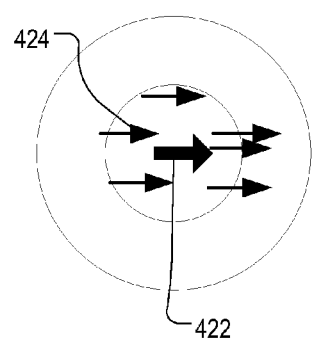
FIG. 4D  FIG. 4E  FIG. 4F

CORRECTING IN-VENUE LOCATION ESTIMATION USING STRUCTURAL INFORMATION

CROSS-REFERENCE TO RELATED APPLICATION

This application claims priority to U.S. Provisional Patent Application No. 62/172,014, entitled "CORRECTING IN-VENUE LOCATION ESTIMATION USING STRUCTURAL INFORMATION," filed Jun. 5, 2015, the entire contents of which are incorporated herein by reference.

TECHNICAL FIELD

This disclosure relates generally to location determination.

BACKGROUND

People often carry mobile devices to a venue where movements can be constrained by structures of the venue. For example, when a person is indoors in a building, barriers including walls, fences or locked doors can limit the person's movement to accessible space in the structure including rooms, hallways or lobbies. The mobile device can use various technologies to determine a location of the user in the venue. These location technologies, however, may not be accurate. Indoor space features such as walls or rooms can be smaller compared to outdoor space features such as streets or buildings. Accordingly, a slight inaccuracy in location determination can mislead a user. For example, an error of several feet associated with an indoor location estimation can result in displaying a location of a user to be in a wall, a column or in the wrong room. By comparison, an error of several feet associated with an outdoor location estimation is generally considered accurate.

SUMMARY

Techniques for correcting in-venue location estimation using structural information are described. A mobile device can use wireless location technologies and dead reckoning to determine an estimated location of the mobile device in a venue (also referred to as an indoor location or in-venue location). The mobile device can compare the estimated location with a map of the venue. Upon determining that the estimated location conflicts with a structural constraint, the mobile device can adjust the location estimation using the structural information. Adjusting the location estimation can include adjusting a statistical filter that provides estimation of the location and changing a heading of the mobile device used in the dead reckoning.

The features described in this specification can be implemented to achieve various advantages. For example, compared to conventional techniques for determining a location, the techniques described can provide a more accurate estimate of a location inside a venue. The techniques combine knowledge of structures of a venue and location estimation. A mobile device implementing the techniques can correct location determination errors that place the mobile device in areas that are physically inaccessible. As a result, the techniques may provide a better user experience when the user navigates inside a venue using the mobile device.

The details of one or more implementations of the techniques are set forth in the accompanying drawings and the description below. Other features, aspects and advantages of the in-venue location survey techniques will become apparent from the description, the drawings and the claims.

BRIEF DESCRIPTION OF THE DRAWINGS

FIGS. 4A-4F illustrates example models for configuring a particle filter used in location estimation.

Like reference symbols in the various drawings indicate like elements.

DETAILED DESCRIPTION

Example Location Estimation

Figure 1:
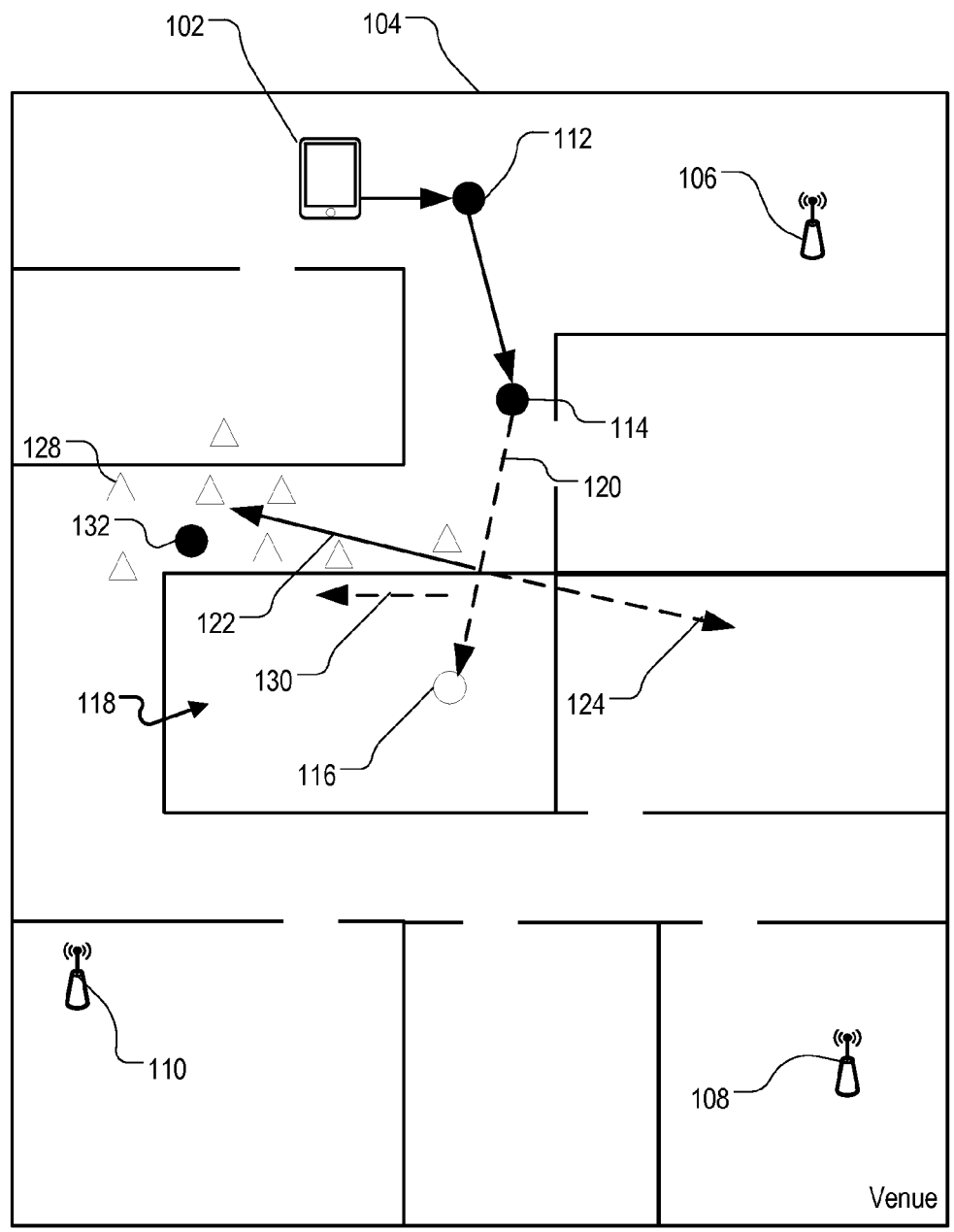
FIG. 1 is a diagram illustrating example location estimation techniques.

FIG. 1 is a diagram illustrating example location estimation techniques. Mobile device 102 can be a device implementing features of location estimation. Mobile device 102 can be carried or worn by a user at venue 104. Mobile device 102 can be programmed to determine a location of mobile device 102 inside venue 104. The user can be a human. The user can be a vehicle programmed to move around in venue 104.

Venue 104 can be a space having a structure that has finer structural granularity than granularity that a positioning system that depends on global navigation satellite system (GNSS) or Wi-Fi™ triangulation can provide. The structure of venue 104 can include one or more structural constraints limiting a user's movement in the space. These constraints can include, for example, map constraints (e.g., walls, railings, or cubicle separators), pathway constraints (e.g., a pedestrian walking on a pathway defined by road signs tends to follow the pathway), or pedestrian motion constraints (e.g., a pedestrian can neither move faster than X miles per hour nor move vertically when not in a stairway or elevator). Venue 104 can be a physical structure. The physical structure can be closed (e.g., an office building) or open (e.g., a stadium). The space can be indoor space, the physical structure or a bounding space of the physical structure if the physical structure is open. Venue 104 can be mobile (e.g., an airplane, a cruise ship or a mobile oil platform). For convenience, estimating a location inside venue 104 will be referred to as in-venue location estimation.

Mobile device 102 can determine an estimated location using wireless signals and motion sensor readings. For example, for in-venue location estimation, mobile device 102 can detect signal sources 106, 108 and 110. Signal sources 106, 108 and 110 can be radio frequency (RF) transmitters located inside or outside of venue 104. For example, signal sources 106, 108 and 110 can be Wi-Fi access points detectable by mobile device 102. Mobile device 102 can acquire one or more measurements of the signals from signal sources 106, 108 and 110. The measurements can include a received signal strength indicator (RSSI) for each RF signal from each signal source. Mobile device 102 can determine a location using the measurements and an RF fingerprint database that stores an RF fingerprint for venue 104. The RF fingerprint can include expected measurement vectors of RF signals at multiple locations in venue 104.

For in-venue location estimation, mobile device 102 can also acquire one or more readings from sensors coupled to mobile device 102. The readings can include, for example, gyroscope readings, magnetometer readings, accelerometer readings, barometer readings or any combination of the above. Using the sensor readings, mobile device 102 can determine heading and velocity of mobile device 102. Mobile device 102 can then determine a location by dead reckoning using an initial location, the heading and the velocity.

Mobile device 102 can use a state space model to fuse the heading and velocity information and wireless measurements to determine an in-venue location. The state space model can include a particle filter. Examples of the state space model are provided below in reference to FIG. 5. Using the heading, velocity, and RSSI information, mobile device 102 can determine that at a time k minus one (k−1), mobile device 102 is located at location 112; at time k, mobile device 102 is located at location 114, and so on, where k is a given point in time, k−1 is a unit time (e.g., one second or five seconds) prior to k in time.

Using the particle filter, mobile device 102 can determine that mobile device 102 is located at location 116 at time k+1, where k+1 is a unit time after k in time. Mobile device 102 can determine that, according to a venue accessibility map, location 116 is located in inaccessible space 118. Inaccessible space 118 can be a portion of venue 104 that a user cannot reach due to various structural constraints of venue 104. For example, inaccessible space 118 can be inside a solid wall, column or a closed stall in a shopping mall.

Upon determining that mobile device 102 is located at location 116 in inaccessible space 118, mobile device 102 can re-calculate the in-venue location of mobile device 102 at time k+1. Mobile device 102 can reconfigure the particle filter by (1) reconfiguring distribution of the particles, (2) changing the heading of mobile device 102, or both (1) and (2).

To reconfigure the distribution of the particles, mobile device 102 can put more weight on particles in a direction that is substantially perpendicular to the current heading of mobile device 102. Mobile device 102 can determine that a current heading, as estimated, is heading 120. Mobile device 102 can determine that, because location 116 appears incorrect, heading 120 may be wrong. To correct, mobile device 102 can determine directions 122 and 124, which can be substantially perpendicular to heading 120. A direction is substantially perpendicular to a heading if their difference is $\pi/2$, with error margin (e.g., plus or minus $\pi/12$, $\pi/24$, etc.). The difference can have a sign (plus "+" or minus "−") that indicates whether the direction is clockwise or counterclockwise of the heading.

Mobile device 102 can determine whether it is feasible for mobile device 102 to move in direction 122 or 124. A feasible direction can be a direction in which mobile device 102 can move, given constraints of venue 104. For example, mobile device 102 can determine that, to move along direction 122, mobile device 102 can reach a location without conficting with a constraint. Accordingly, mobile device 102 can determine that direction 122 is a feasible direction. Mobile device 102 can determine that to move along direction 124, mobile device 102 needs to penetrate an inaccessible space or go around a number of constraints that require a travel speed faster than possible for a pedestrian. Accordingly, mobile device 102 can determine that direction 124 is an infeasible direction.

Mobile device can assign more weight to feasible direction 122 in a next in-venue location estimate. Assigning more weight can include increasing the number of particles in feasible direction 122 for use in the particle filter. Each particle can be a candidate location of mobile device 102. In a conventional system, when a mobile device determines that a location estimate is inaccurate (e.g., in an inaccessible space), the mobile device can assign randomly chosen particles in venue 104. In contrast to the conventional techniques, mobile device 102 can select more particles 128 (each represented as a triangle in FIG. 1) in direction 122 than what a random selection might select.

In addition, mobile device 102 can update heading 120 of mobile device 102 to heading 130. Mobile device 102 can update heading 120 by an amount that is less than a right angle (e.g., by $\pi/2 - \pi/12 = 5\pi/12$ radians). Updated heading 130 can have the same sign as feasible direction 122.

Mobile device 102 can then estimate a location of mobile device 102 using the particle filter, observations from mobile device 102, and the motion sensor information. Mobile device 102 can designate particles 128 as samples for propagation in the particle filter. Propagating particle filter can include applying available information, including map of constraints in venue 104 and heading 130 to the particle filter to determine probability density of particles 128 in a portion of venue 104, given previous locations 112 and 114. Mobile device 102 can determine that the in-venue location of mobile device 102 is at location 132 instead of location 116. Mobile device 102 can display a representation of location 132 on a map of venue 104, e.g., as a pin.

Example Venue Accessibility Map

Figure 2:
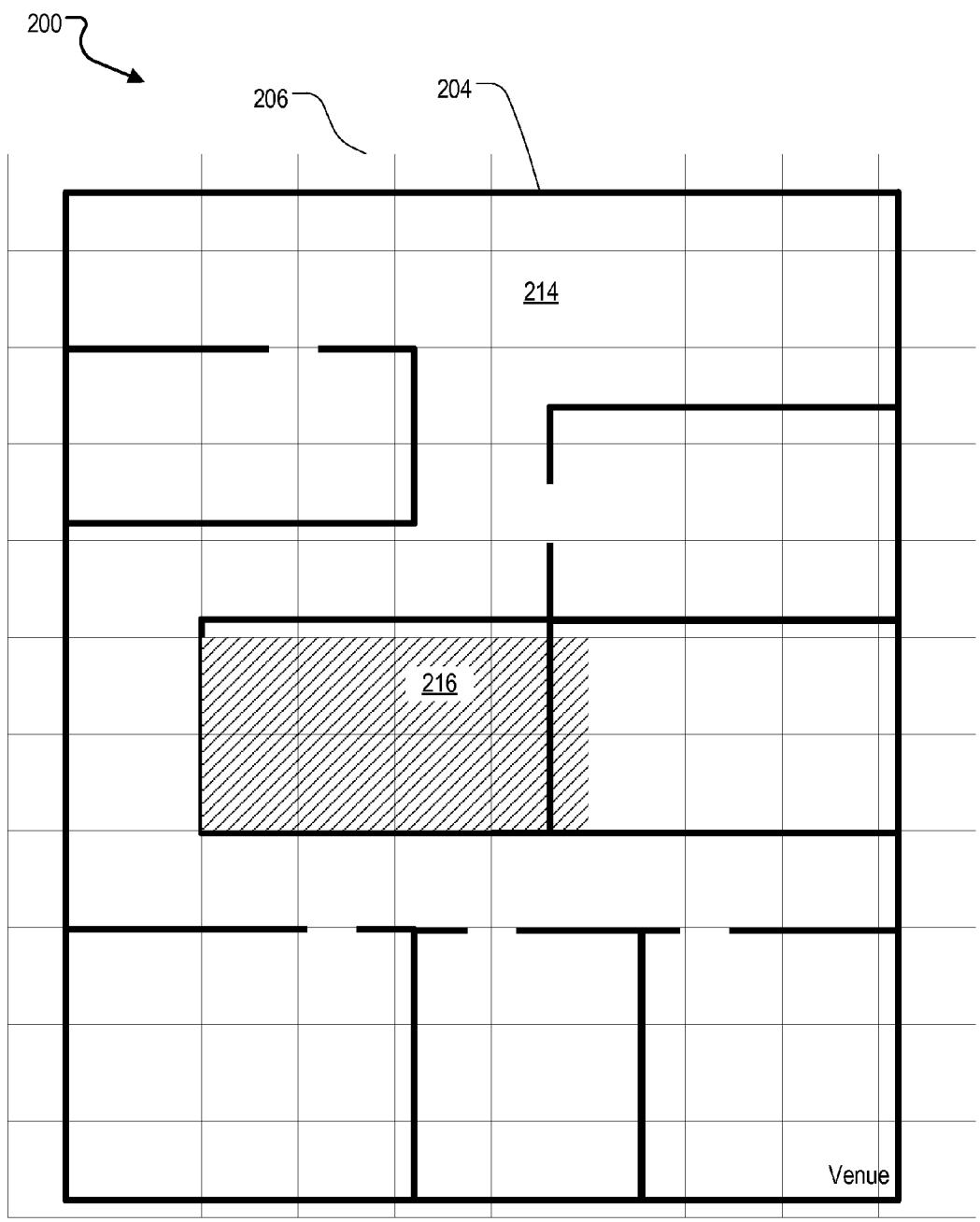
FIG. 2 illustrates an example venue accessibility map used in location estimation.

FIG. 2 illustrates example venue accessibility map 200 used in location estimation. Venue accessibility map 200 can indicate which areas of venue 104 are inaccessible. Mobile device 102 can use venue accessibility map 200 to determine whether an in-venue location determined by mobile device 102 may be in error.

Venue accessibility map 200 can include venue map 204. Venue map 204 can be a map of venue 104 provided by a venue data source, e.g., a data store of an owner of venue 104. Venue map 204 can include representations of hallways, walls, rooms, doors and other structural constraints of venue 104.

A computer configured to generate venue accessibility map 200 can overlay grid 206 on venue map 204. Grid 206 (not drawn to scale) can including multiple cells, e.g., cell 214 and cell 216. Each cell can have a rectangular shape (e.g., a square) having a size that corresponds to a width that a pedestrian can pass. In some implementations, other shapes (e.g., other polygons) can define cells. For example, each of cells 214 and 216 can be a square of 0.9 meters on each side. Each cell can be associated with a binary value that indicates whether the area of venue 104 corresponding to the cell is accessible by a pedestrian. For example, cell 214 can be associated with value 1, indicating that the 0.9 meter by 0.9 meter area corresponding to cell 214 is accessible. Cell 216 can be associated with value 0, indicating that the 0.9 meter by 0.9 meter area corresponding to cell 216 is inaccessible. The computer can provide venue map 204 overlaid with grid 206 as venue accessibility map 200 to mobile device 102.

Mobile device 102 can determine an estimated location, e.g., location 116. Using venue accessibility map 200, mobile device 102 can determine cell 216 of grid 206 that corresponds to location 116. Mobile device 102 can then determine whether location 116 is accessible or inaccessible using the value of cell 216 based on the binary value associated with cell 216. Mobile device 102 can adjust a heading and reconfigure a particle filter upon determining that location 116 is inaccessible.

Figure 3A:
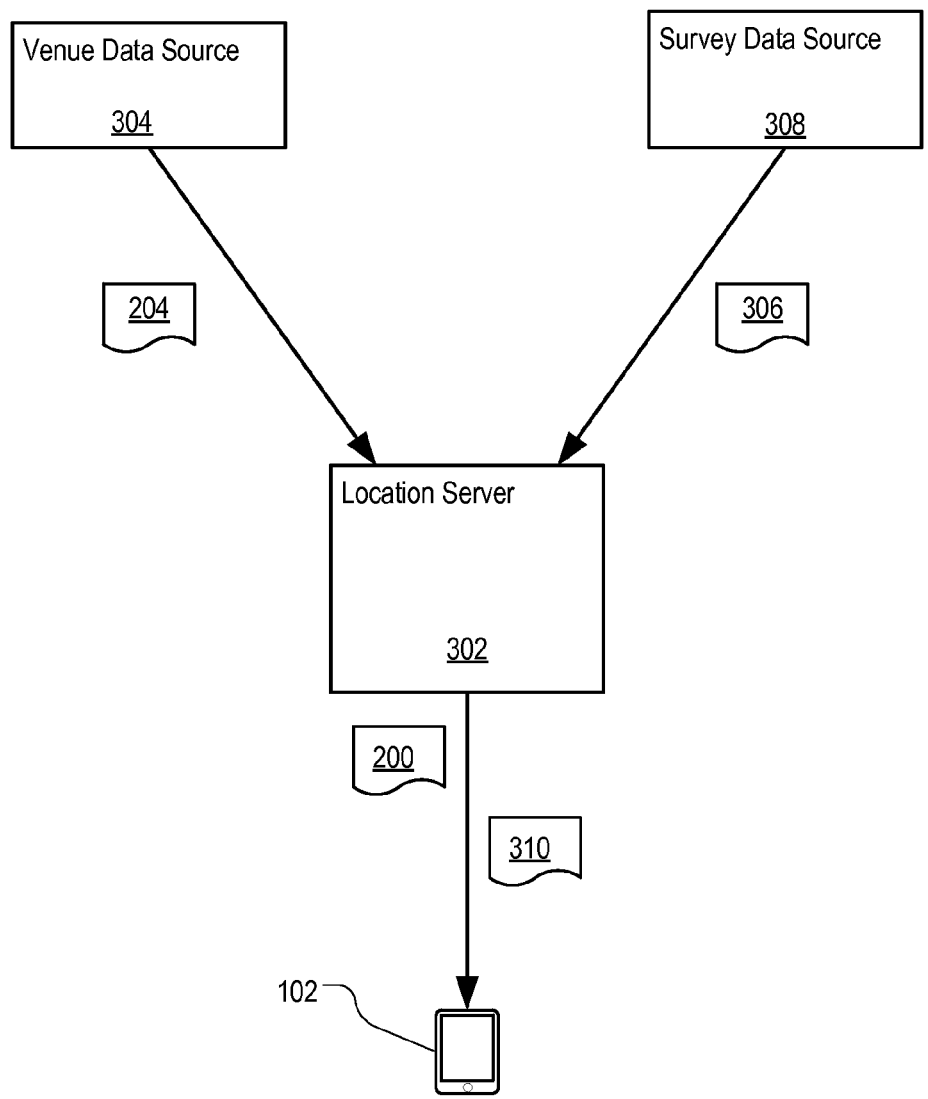
FIGS. 3A and 3B illustrate example techniques for generating a venue accessibility map.
Figure 3B:
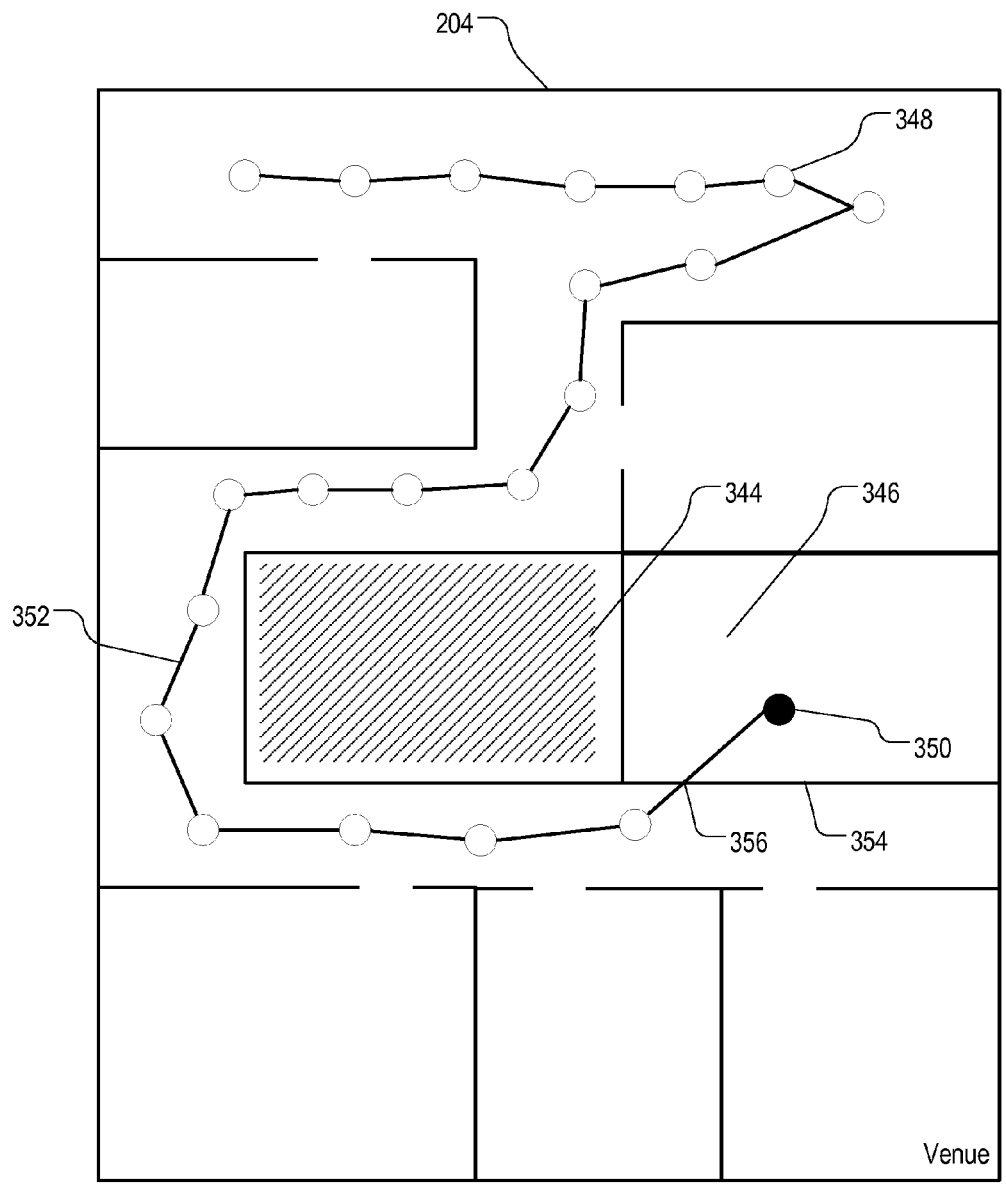

FIGS. 3A and 3B illustrate example techniques for generating venue accessibility map 200. FIG. 3A is a block diagram illustrating example data flow. Location server 302 can include one or more computers configured to generate venue accessibility map 200. Location server 302 can receive venue map 204 from venue data source 304. Venue map 204 can include a geographic location of venue 104, as well as coordinates, sizes, types and functions of structural features in venue 104.

Location server 302 can receive survey data 306 from survey data source 308. Survey data 306 can be created by survey data source 308 based on surveys of venue 104. A survey can include a sampling device moving in various areas of venue 104 and recording RF signal measurements as the surveyor moves. The sampling device can be carried by surveyor (e.g., a person or a vehicle) moving inside venue 104. Survey data 306 can include records of locations visited by the sampling device, and the measurements associated with the locations.

Location server 302 can determine venue accessibility map 200 and RF fingerprint 310 from the venue map 204 and survey data 306. RF fingerprint 310 can include expected signal measurements at various locations inside venue 104. Location server 302 can provide venue accessibility map 200 and RF fingerprint 310 to mobile device 102 for in-venue location estimation.

FIG. 3B illustrates example techniques of generating grid 206 for overlaying on venue map 204. In a first stage, location server 302 can determine open areas in venue 104 according to geometry of venue map 204. The open areas can be areas that are unblocked and reachable from an entrance of venue 104, e.g., through doors, hallways, elevator/escalators or aisles as indicated in venue map 204. Location server 302 can mark the open areas as accessible in the corresponding grid cells.

Some areas of venue 104 may appear blocked off in venue map 204. For example, according to venue map 204, areas 344 and 346 can appear to be completely surrounded by walls without apparent doorways. However, these areas can be physically accessible to pedestrians. This can happen when the venue data provider does not have complete information for venue 104. For example, venue 104 can be a shopping mall with stalls corresponding to shops located in the shopping mall. Each shop is responsible for managing its own floor plan. Accordingly, the mall owner who provided venue map 204 may not know where a door to area 344 or 346 is located.

Location server 302 can determine whether areas 344 and 346 are accessible in a second stage. Using survey data 306, location server 302 can determine that a sampling device has travelled to locations 348 in venue 104. Each of locations 348 travelled is marked as a circle in FIG. 3B. In particular, location server 302 can determine that the sampling device has travelled to location 350. Location 350 is located inside of area 346. Accordingly, although area 346 does not appear to be accessible in venue map 204, location server 302 can determine that area 346 is accessible, based on survey data. Location server 302 can mark the corresponding cells in grid 206 to indicate that area 346 is accessible.

In addition, location server 302 can determine path 352 travelled by the sampling device. Location server 302 can determine that path 352 intersects constraint (wall) 354 at point 356. Accordingly, location server 302 can determine that constraint 354 has at least one opening at point 356 that permits a pedestrian to enter area 346.

FIGS. 4A-4F illustrate example models for configuring a particle filter used in location estimation. FIG. 4A illustrates a location estimation in a simplest version. Mobile device 102 can add Gaussian random noise to each particle with a fixed variance per unit time. Particle 402, represented as a solid dot in FIG. 4A, is a particle at time k. Particles 404, each represented as a circle, are particles at time k+1, which is a unit time after time k. Mobile device 102 can then filter the particles 404 using an observation. An observation can include a set of measurements (e.g., RSSIs) of signal sources detected in a wireless scan.

FIG. 4B illustrates a location estimation where mobile device 102 has pedometry information indicating that a user of mobile device 102 is walking Mobile device 102 can add small Gaussian random noise to the particles where a Laplacian is set at stride length. Particle 406 is a particle at time k. Particles 408 are particles at time k+1.

FIG. 4C illustrates a location estimation where mobile device 102 has pedometry information indicating that a user of mobile device 102 is not walking Mobile device 102 can add small Gaussian random noise to the particles with a fixed variance per unit time. Particle 410 is a particle at time k. Particles 412 are particles at time k+1.

FIG. 4D illustrates a motion and prediction where mobile device 102 has pedometry information. Mobile device 102 may not have specific information on whether a user of mobile device 102 is walking or is stationary. Mobile device 102 can add Gaussian random noise to each particle with a fixed variance per unit time, as well as distributed heading change. Particle 414 is a particle at time k. Particle 414 is associated with a heading, represented in FIG. 4D as an arrow. Particles 416, each represented by an arrow indicating a respective heading, are particles at time k+1. Before mobile device 102 determines that an estimated location is in inaccessible space 118, mobile device 102 can designate heading 120 as the heading. After mobile device 102 determines that an estimated location is in inaccessible space 118, mobile device 102 can designate heading 130 as the heading.

FIG. 4E illustrates motion and prediction where mobile device 102 has pedometer information and heading information. The pedometer information can indicate that mobile device 102 is being carried by a user who is walking at time k. Mobile device 102 can add truncated Gaussian random noise to each particle with a fixed variance per unit time, as well as distributed heading change. Mobile device 102 can truncate Gaussian random noise in the heading of mobile device 102. Particle 418 is a particle at time k. Particles 418 are associated with a heading, represented in FIG. 4E as an arrow. Before mobile device 102 determines that an estimated location is in inaccessible space 118, mobile device 102 can designate heading 120 as the heading. After mobile device 102 determines that an estimated location is in inaccessible space 118, mobile device 102 can designate heading 130 as the heading. Particles 420 are particles selected at time k+1, in the direction of heading 130.

FIG. 4F illustrates motion and prediction where a mobile device has pedometer information and heading information. The pedometer information can indicate that mobile device 102 is stationary at time k. Mobile device 102 can add small Gaussian random noise to each particle with a fixed variance per unit time, as well as a fixed heading that corresponds to the heading of mobile device 102 at time k. Particle 422 is a particle at time k. Particles 424 are particles at time k+1. Before mobile device 102 determines that an estimated location is in inaccessible space 118, mobile device 102 can designate heading 120 as the heading. After mobile device 102 determines that an estimated location is in inaccessible space 118, mobile device 102 can designate heading 130 as the heading.

Example Device

Figure 5:
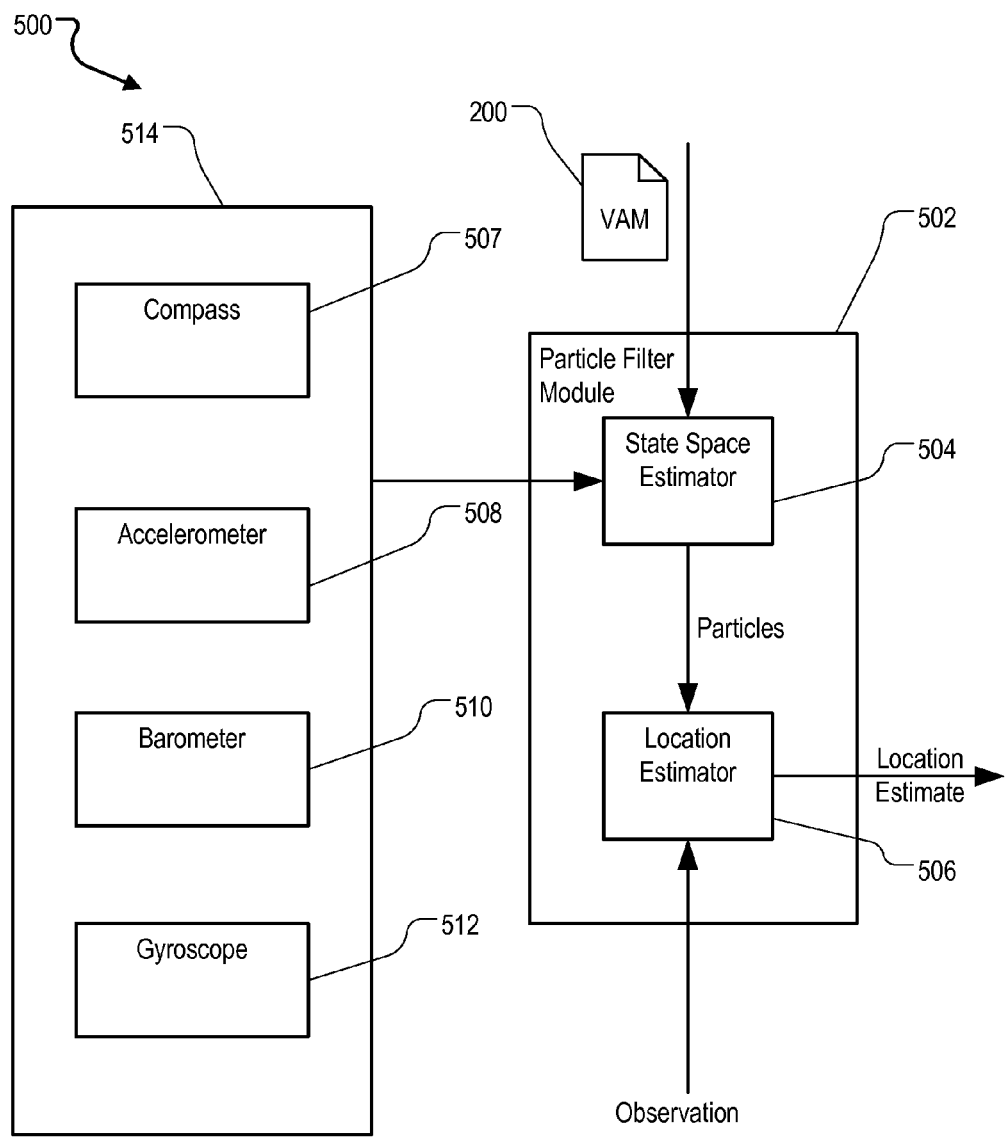
FIG. 5 is a block diagram illustrating components of an example location estimation subsystem of a mobile device.

FIG. 5 is a block diagram illustrating components of example location estimation subsystem 500 of mobile device 102.

Mobile device 102 can use available information to estimate a location in venue 104. The available information can include, for example, motion models, motion measurements, environmental constraints, and map constraints. Mobile device 102 can then use a state space model to fuse available information from different information sources.

The state space model can be a simulation-based estimation model, e.g., a particle filter. Particle filter module 502 of mobile device 102 can estimate a probability density of current locations $x_k$ of mobile device 102 using the particle filter based on a previous location $x_{k-1}$ conditioned upon a observation $z_k$, where k is a given point in time, k−1 is a point prior to k in time. Observation $z_k$ can include one or more sensor readings at time k. The sensor readings can include RSSI readings, motion sensor readings and barometer readings. The time length between k and k−1 can be configurable (e.g., one second or five seconds).

Particle filter module 502 can include state space estimator 504. State space estimator 504 can be configured to receive available information and include the available information into location estimator 506, which is a component of particle filter module 502 configured to provide a location estimate.

State space estimator 504 can receive, from a storage device of location server 302 or of mobile device 102, venue accessibility map 200. State space estimator 504 can determine that the pedestrian cannot transition through the structural constraint. State space estimator 504 can determine a likelihood where the pedestrian may move within a given time interval, given limited motion speed of the pedestrian.

State space estimator 504 can receive, from sensors 514, a motion context. The motion context can include readings of sensors 514. Sensors 514 can include micro-electromechanical systems (MEMS) of mobile device 102. For example, sensors 514 can include magnetometer 507 configured to determine a direction of a pedestrian's heading, accelerometer 508 configured to determine whether a pedestrian's movement is walking or running, a pace of the movement, and a stride of the movement. Sensors 514 can include barometer 510 configured to determine whether a pedestrian is moving vertically (e.g., in an elevator or on stairs) based on air pressure. Sensors 514 can include gyroscope 512 configured to determine whether a pedestrian is turning.

Based on the motion context, state space estimator 504 can determine if a pedestrian carrying mobile device 102 is stationary or non-stationary. If state space estimator 504 determines that the pedestrian is stationary, state space estimator 504 can configure location estimator 506 using state space system noise (e.g., random locations). If state space estimator 504 determines that the pedestrian is non-stationary, state space estimator 504 can configure location estimator 506 using the speed of the pedestrian to drive state space update of location estimator 506.

State space estimator 504 can determine attitude information based on the motion context data received from sensors 514. The attitude information can include a heading of the pedestrian determined using a series of motion context data received from sensors 514. State space estimator 504 can receive the series of motion context data over time, and estimate a heading based on the series of motion context data using a filter configured to use a series of measurements observed over time to produce estimates of unknown variables.

Based on the map constraints, the motion context, and the attitude information, state space estimator 504 can determine candidate locations of mobile device 102. State space estimator 504 can designate the candidate locations as particles for propagation in particle filter $P(X_k|X_{k-1})$, where $X_k$ represents current candidate locations of mobile device 102 at time k, $X_{k-1}$ represents previous locations at time k−1. The current candidate locations can include particles 128 in feasible direction 122. Propagating the particle filter can include applying the available information, including venue accessibility map 200, motion context, attitude information and updated heading 130 to the particle filter to determine probability density of the candidate locations in at least a portion of the venue, given previous locations. Propagating the particle filter can be based on a stochastic process for exploring some or all potential constraints. In some implementations, the stochastic process can be a discretized Wiener process. Propagating the particle filter can be subject to a multi-dimensional correlation function based on availability of the constraints.

State space estimator 504 can detect particle depletion when a number of candidate locations fall below a threshold number sufficient for a probability density calculation. Upon such detection, state space estimator 504 can perform a parallel resampling of a portion of venue 104 or the entirety of venue 104 to recover from filter divergence.

Upon propagating the particle filter, state space estimator 504 can provide the particle filter to location estimator 506 for update. Location estimator 506 can update the particle filter using a location observation received from one or more wireless receivers. Updating the particle filter can include feeding estimated fingerprint location into the particle filter. The location observation can be subject to a measurement model having a given system uncertainty. Updating the particle filter can include calculating probability density $P(X_k|X_{k-1},Z_k)$ where $Z_k$ is an observation at time k. Location estimator 506 can then determine a current location of mobile device 102 (location at time k) using the probability density, including designating a most likely location of mobile device 102 as the current location of mobile device 102 in venue 104.

Figure 6:
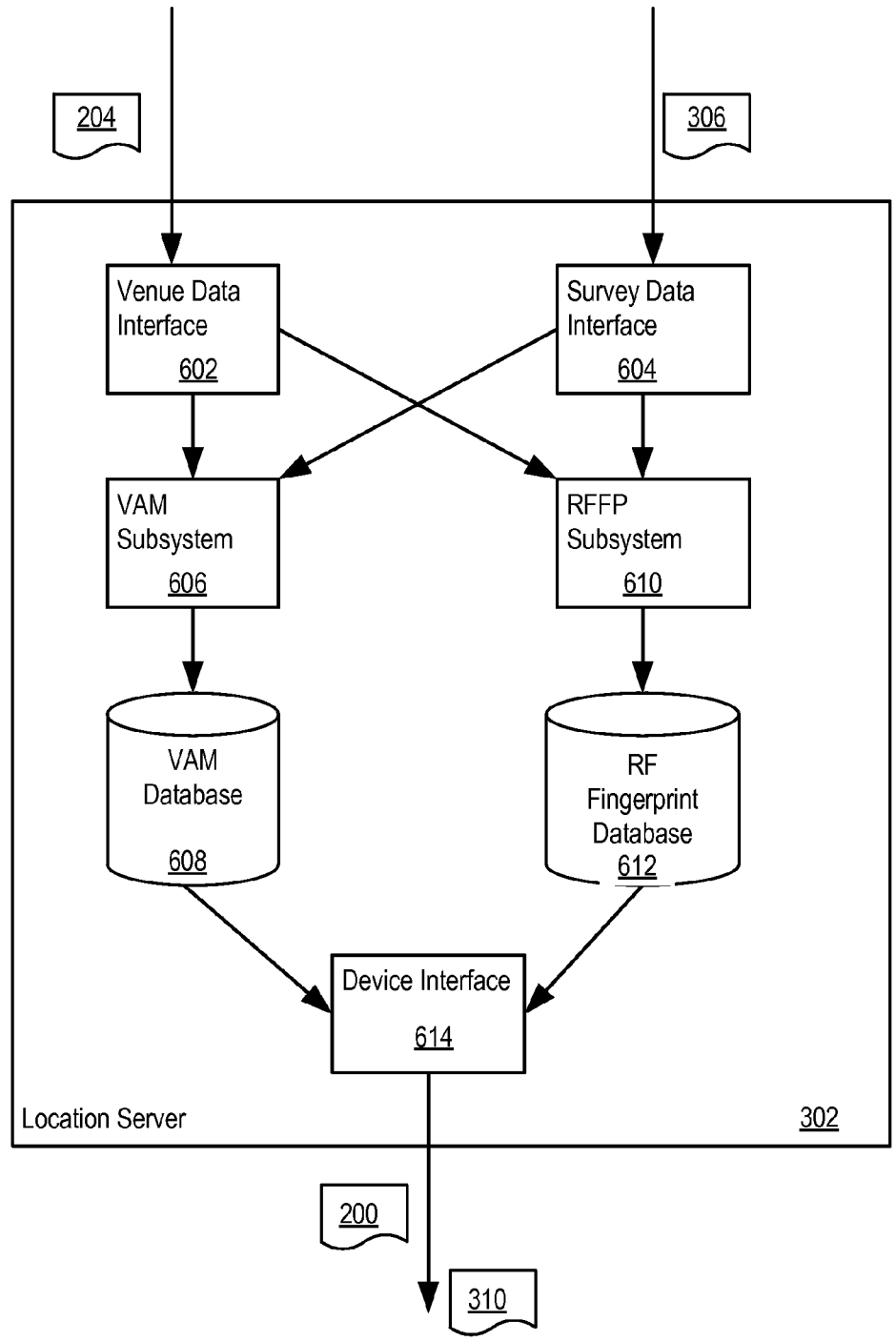
FIG. 6 is a block diagram illustrating components of an example location server.

FIG. 6 is a block diagram illustrating components of example location server 302. Location server 302 can include one or more computers. Each component of location server 302 can include one or more processors.

Location server 302 can include venue data interface module 602. Venue data interface module 602 is a component of location server 302 configured to receive venue map 204 from a venue data source. Location server 302 can include survey data interface module 604. Survey data interface module 604 is a component of location server 302 configured to receive survey data 306 from a survey data source.

Location server 302 can include venue accessibility map subsystem 606. Venue accessibility map subsystem 606 is a component of location server 302 configured to determine which area of a venue is accessible using venue map 204 and survey data 306 received by venue data interface module 602 and survey data interface module 604. Venue accessibility map subsystem 606 can then generate a venue accessibility map (e.g., venue accessibility map 200) and store the venue accessibility map in venue accessibility map database 608.

Location server 302 can include RF fingerprint subsystem 610. RF fingerprint subsystem 610 is a component of location server 302 configured to determine an RF fingerprint for each venue using venue map 204 and survey data 306 received by venue data interface module 602 and survey data interface module 604. RF fingerprint subsystem 610 can then generate an RF fingerprint for each venue and store the RF fingerprint in RF fingerprint database 612.

Location server 302 can include device interface module 614. Device interface module 614 can receive a request from a mobile device (e.g., mobile device 102) including a venue identifier. In response, device interface module 614 can retrieve a venue accessibility map from venue accessibility map database 608 using the venue identifier. Device interface module 614 can retrieve an RF fingerprint from RF fingerprint database 612 using the venue identifier. Device interface module 614 can then submit the retrieved venue accessibility map (e.g., venue accessibility map 200) and the retrieved RF fingerprint (e.g., RF fingerprint 310) to the mobile device.

Example Procedures

Figure 7:
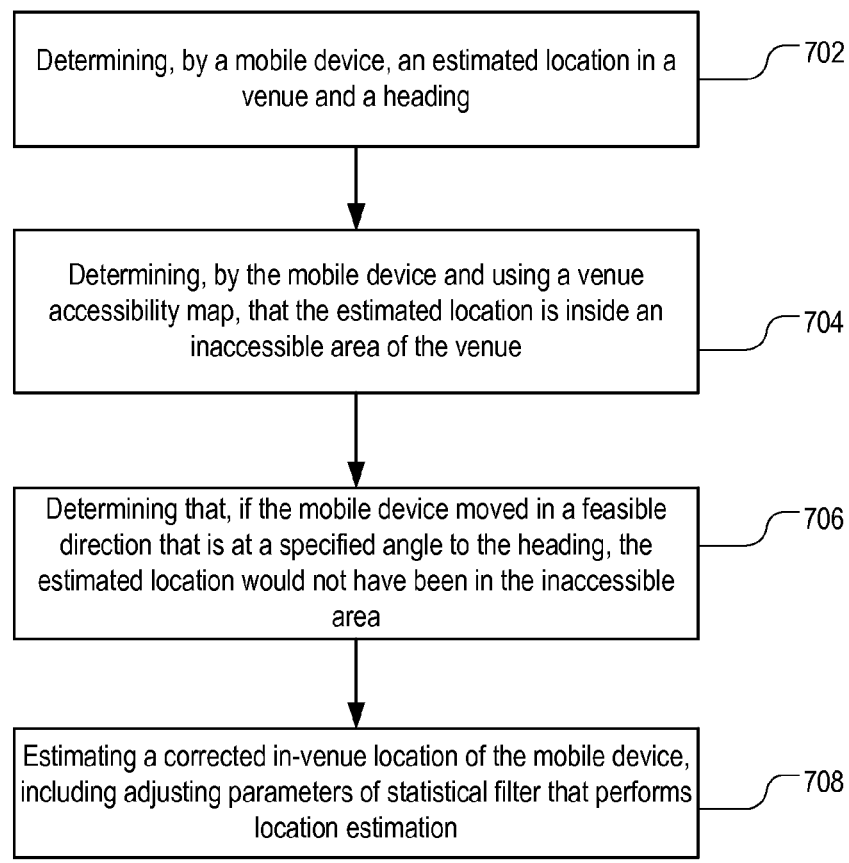
FIG. 7 is a flowchart of an example process of location estimation.

FIG. 7 is a flowchart of example process 700 of location estimation. Process 700 can be performed by mobile device 102.

Mobile device 102 can determine (702) an in-venue location and a heading of mobile device 102. The in-venue location can be an estimated location of mobile device 102 inside of a venue that is accessible by a pedestrian. The venue can include structural constraints limiting movement of the pedestrian. Mobile device 102 can estimate the in-venue location using a statistical filter of mobile device 102. The heading can be an estimated direction in which mobile device 102 is moving. Mobile device 102 can estimate the direction based on one or more motion sensor readings of mobile device 102. The statistical filter can be a particle filter for estimating a location by filtering particles. Each particle can be a candidate location of mobile device 102 in the venue.

Mobile device 102 can determine (704), using a venue accessibility map (e.g., venue accessibility map 200), that the estimated location is inside an inaccessible area of the venue. According to the constraints in the venue as represented in the venue accessibility map, a user of the mobile device 102 cannot reach the inaccessible area. The venue accessibility map can include a digital map representing location of the venue and the structural constraints in the venue. The venue accessibility map can further include a grid overlaid on the digital map. The grid can have multiple cells each having a binary value. The binary value of a cell can indicate whether a portion of the venue overlaid by the cell is accessible or inaccessible by a pedestrian.

Mobile device 102 can determine (706) that, if mobile device 102 moved in a feasible direction that is at a specified angle to the heading, the estimated location would not have been in the inaccessible area and would have been accessible by the user. The specified angle can be substantially a right angle that has a sign indicating whether the feasible direction is clockwise (e.g., to the right of) or counter-clockwise (e.g., to the left of) to the heading. In some implementations, mobile device 102 can adjust the heading of the mobile device by an amount that is less than the specified angle and that has the same sign as the specified angle. Mobile device 102 can use the adjusted heading in a next location estimation using the particle filter or by dead reckoning.

Mobile device 102 can estimate (708) a corrected in-venue location of mobile device 102 by adjusting the statistical filter parameters by assigning more weights along the feasible direction in estimating a location of the mobile device using the statistical filter. Adjusting the statistical filter parameters can include selecting candidate locations along the feasible direction for filtering in a next iteration of location estimation. Mobile device 102 can present the corrected in-venue location for display on mobile device 102.

Figure 8:
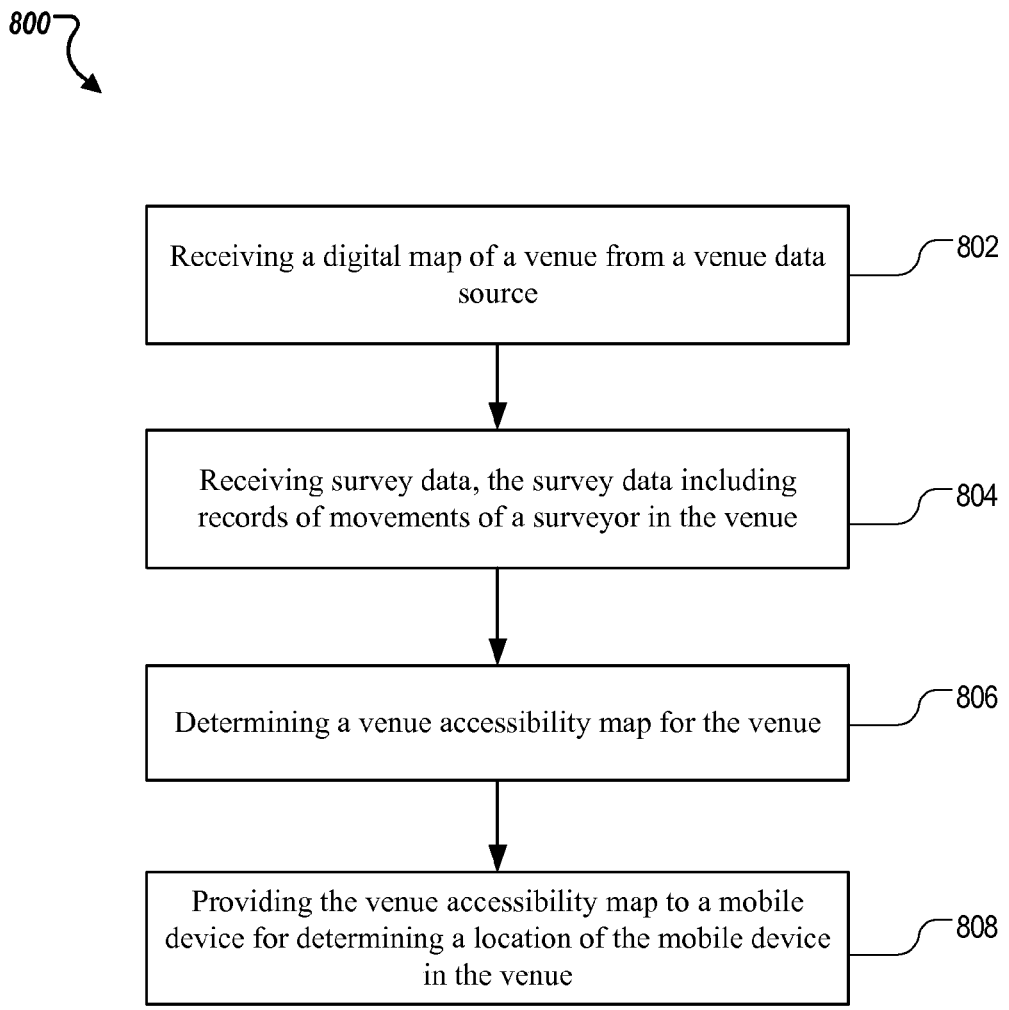
FIG. 8 is a flowchart of an example process of generating a venue accessibility map.

FIG. 8 is a flowchart of example process 800 of generating a venue accessibility map (e.g., venue accessibility map 200). Process 800 can be performed by a location server including one or more processors, e.g., location server 302.

Location server 302 can receive (802) a digital map of a venue (e.g., venue map 204) from a venue data source. The venue (e.g., venue 104) can be accessible by a pedestrian and can include constraints limiting movements of the pedestrian. The digital map can represent the constraints.

Location server 302 can receive (804) survey data. The survey data can include records of movements of a surveyor in the venue. The records can indicate that the surveyor entered, or has ability to enter, an area in the venue that is marked as inaccessible according to the represented constraints.

Location server 302 can determine (806) a venue accessibility map (e.g., venue accessibility map 200) for the venue. The venue accessibility map can include a layer on the digital map that indicates which portions of the venue are accessible by the pedestrian. The layer can include a grid overlaid on the digital map. The grid can have multiple cells each indicating whether a portion of the venue overlaid by the cell is accessible or inaccessible. In particular, the venue accessibility map can designate as accessible the area that (1) is marked as inaccessible according to the constraints represented in the venue map, but (2) is entered or could have been entered by the surveyor. Each cell can be configured to have a size that corresponds to a width that is passable by the pedestrian.

Location server 302 can provide (808) the venue accessibility map to a mobile device for determining a location of the mobile device in the venue. The mobile device can perform operations described in reference to FIG. 7 using the venue accessibility map.

Example Mobile Device Architecture

Figure 9:
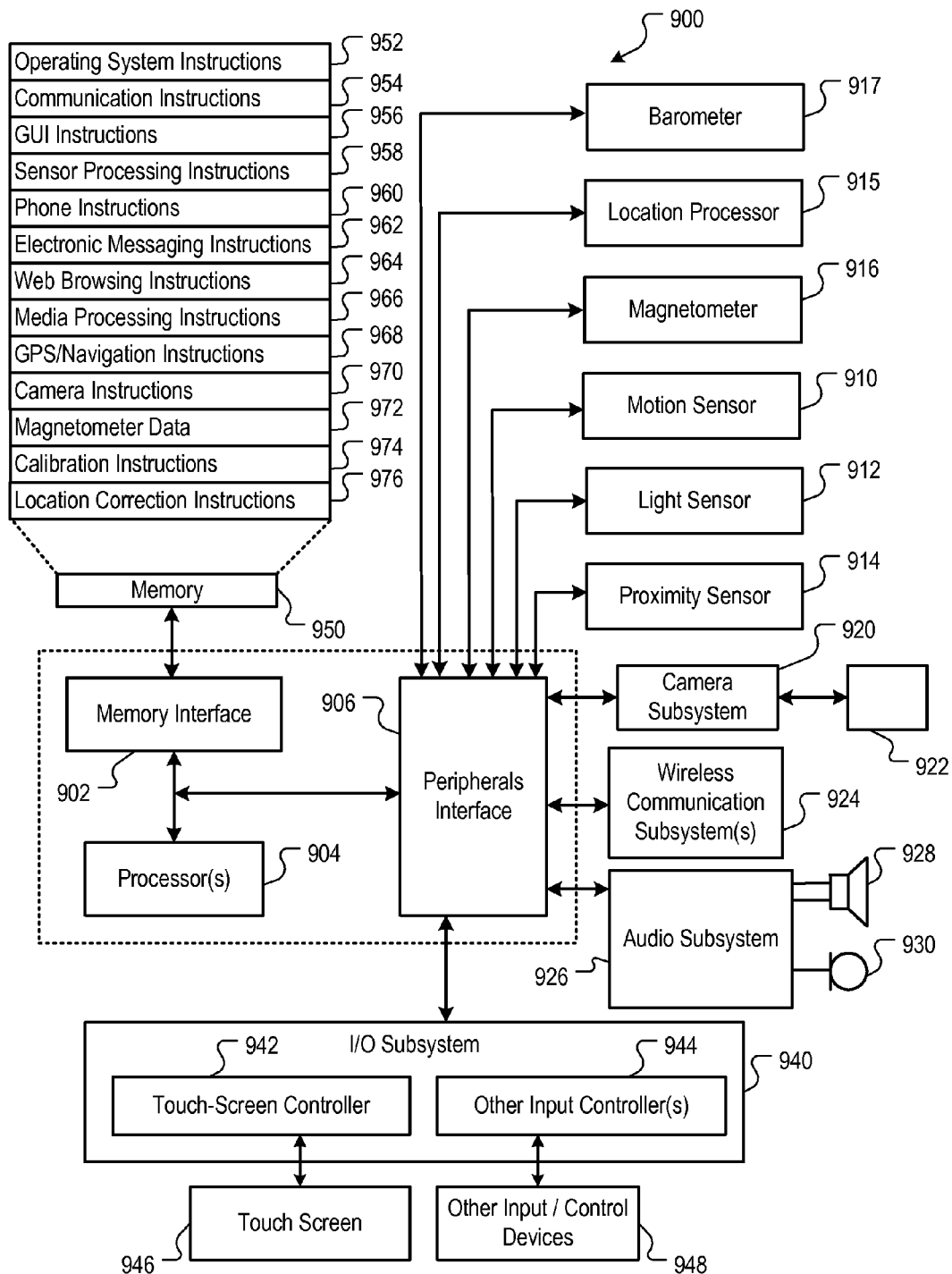
FIG. 9 is a block diagram illustrating an example device architecture of a mobile device implementing the features and operations described in reference to FIGS. 1-8.

FIG. 9 is a block diagram of an example architecture 900 for mobile device 102. Mobile device 102 can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include application processors, baseband processors, and wireless processors. The various components in mobile device 102, for example, can be coupled by one or more communication buses or signal lines.

Sensors, devices and subsystems can be coupled to peripherals interface 906 to facilitate multiple functionalities. For example, motion sensor 910, light sensor 912 and proximity sensor 914 can be coupled to peripherals interface 906 to facilitate orientation, lighting and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Motion sensor 910 can include one or more accelerometers configured to determine change of speed and direction of movement of the mobile device. Barometer 917 can include one or more devices connected to peripherals interface 906 and configured to measure pressure of atmosphere around the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi™ or WiMax™ network and a Bluetooth™ network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions. Audio subsystem 926 can be configured to receive voice commands from the user.

I/O subsystem 940 can include touch surface controller 942 and/or other input controller(s) 944. Touch surface controller 942 can be coupled to a touch surface 946 or pad. Touch surface 946 and touch surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 946. Touch surface 946 can include, for example, a touch screen.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch surface 946; and a pressing of the button for a second duration that is longer than the first duration may turn power to mobile device 102 on or off. The user may be able to customize a functionality of one or more of the buttons. The touch surface 946 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can store location correction instructions 976 that, when executed, can cause processor 904 to perform operations of example process 700 as described above in reference to FIG. 7.

Each of the above identified instructions and applications can correspond to a set of instructions for performing one or more functions described above. These instructions need not be implemented as separate software programs, procedures or modules. Memory 950 can include additional instructions or fewer instructions. Furthermore, various functions of the mobile device may be implemented in hardware and/or in software, including in one or more signal processing and/or application specific integrated circuits.

Example Operating Environment

Figure 10:
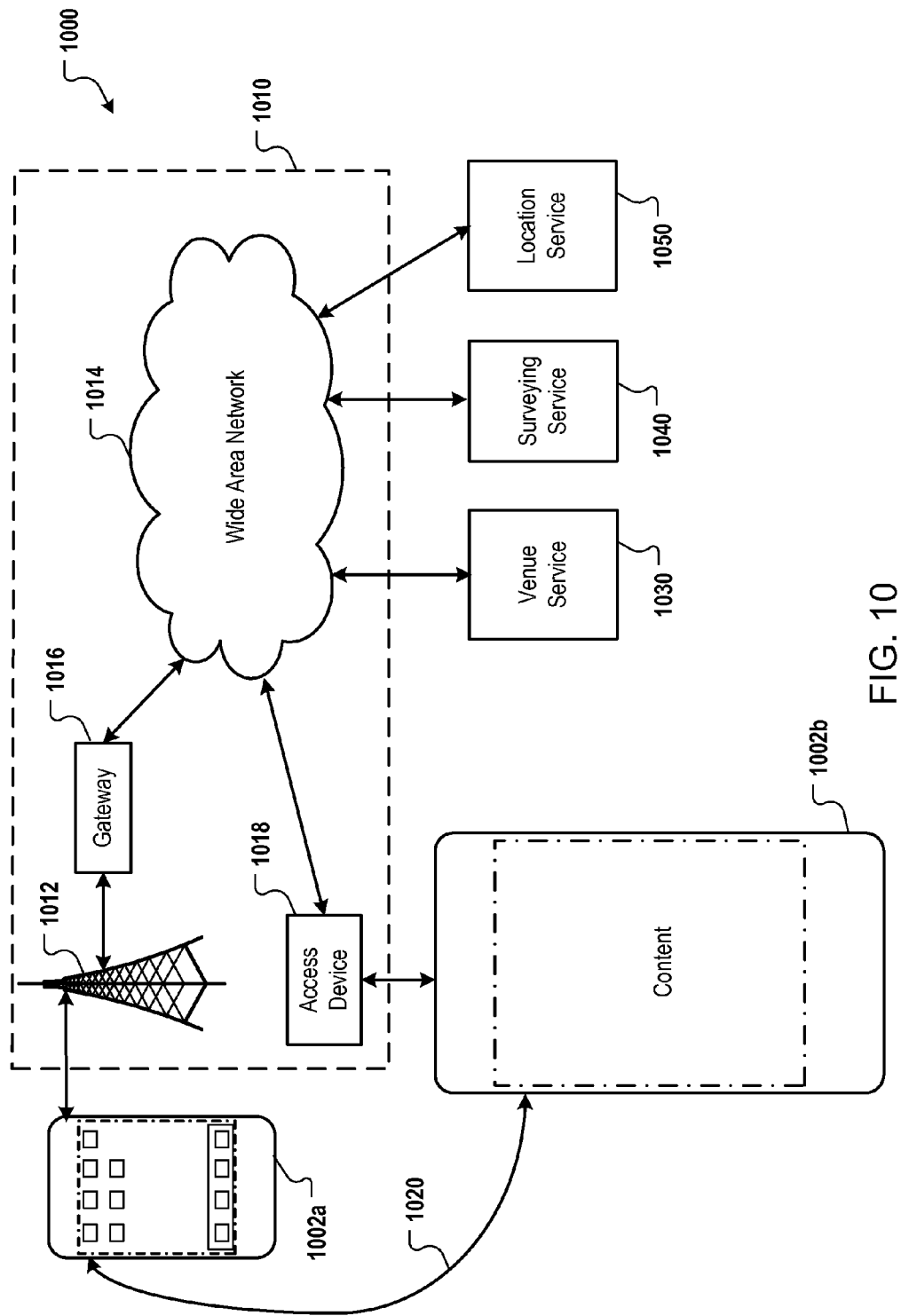
FIG. 10 is a block diagram of an example network operating environment for the mobile devices of FIGS. 1-9.

FIG. 10 is a block diagram of an example network operating environment 1000 for the mobile devices of FIGS. 1-9. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access point, can provide communication access to the wide area network 1014. Each of mobile devices 1002a and 1002b can be mobile device 102.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless device 1002a can communicate with other wireless devices, e.g., other mobile devices, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030, 1040, and 1050 over the one or more wired and/or wireless networks. For example, one or more venue services 1030 can provide venue information to mobile devices 1002a and 1002b from a venue data source. The venue information can include venue identifiers associated with venue maps. Survey service 1040 can receive survey data from one or more sampling devices and provide the survey data to location server 302. Location server 302 can provide location service 1050. Location service 1050 can include providing venue accessibility maps and RF fingerprints to mobile devices 1002a and 1002b.

Mobile device 1002a or 1002b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

Example System Architecture

Figure 11:
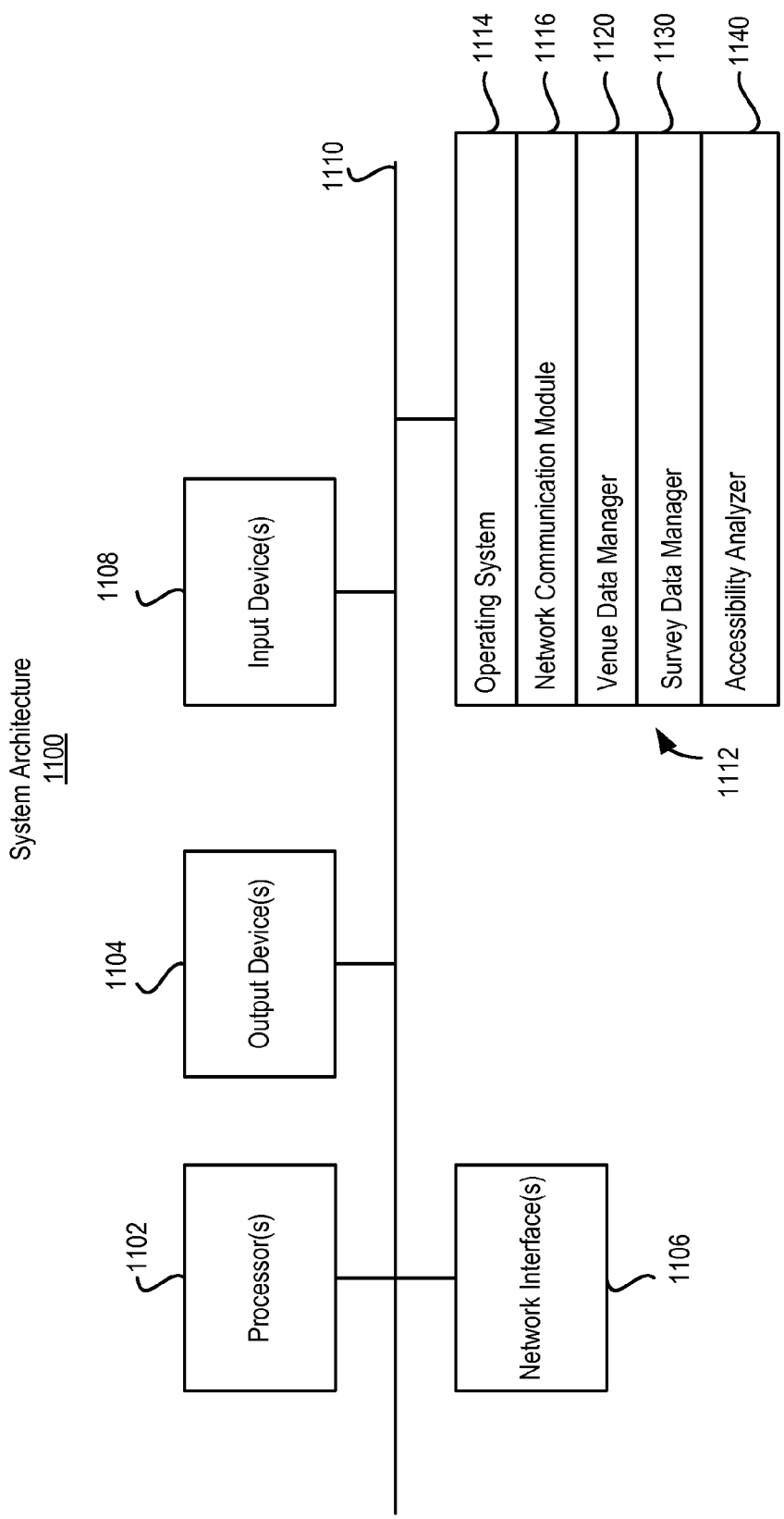
FIG. 11 is a block diagram of a system architecture for an example location server.

FIG. 11 is a block diagram of a system architecture for example location server 302. Other architectures are possible, including architectures with more or fewer components. In some implementations, architecture 1100 includes one or more processors 1102 (e.g., dual-core Intel® Xeon® Processors), one or more output devices 1104 (e.g., LCD), one or more network interfaces 1106, one or more input devices 1108 (e.g., mouse, keyboard, touch-sensitive display) and one or more computer-readable mediums 1112 (e.g., RAM, ROM, SDRAM, hard disk, optical disk, flash memory, etc.). These components can exchange communications and data over one or more communication channels 1110 (e.g., buses), which can utilize various hardware and software for facilitating the transfer of data and control signals between components.

The term "computer-readable medium" refers to a medium that participates in providing instructions to processor 1102 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1112 can further include operating system 1114 (e.g., a Linux® operating system), network communication module 1116, venue data manager 1120, survey data manager 1130 and accessibility analyzer 1140. Operating system 1114 can be multi-user, multiprocessing, multitasking, multithreading, real time, etc. Operating system 1114 performs basic tasks, including but not limited to: recognizing input from and providing output to network interfaces 1106, input devices 1108; keeping track and managing files and directories on computer-readable mediums 1112 (e.g., memory or a storage device); controlling peripheral devices; and managing traffic on the one or more communication channels 1110. Network communications module 1116 includes various components for establishing and maintaining network connections (e.g., software for implementing communication protocols, such as TCP/IP, HTTP, etc.).

Venue data manager 1120 can include computer instructions that, when executed, cause processor 1102 to perform functions of venue data interface module 602. Survey data manager 1130 can include computer instructions that, when executed, cause processor 1102 to perform operations of survey data interface module 604. Accessibility analyzer 1140 can include computer instructions that, when executed, cause processor 1102 to perform the operations of venue accessibility map subsystem 606 and device interface module 614.

Architecture 1100 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result.

A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
   determining, by a mobile device, an in-venue location and a heading, the in-venue location being an estimated location of the mobile device inside of a venue that is accessible by a pedestrian and that includes constraints limiting movement of the pedestrian, the in-venue location being estimated using a statistical filter of the mobile device, the heading being estimated based on one or more motion sensor readings of the mobile device;
   determining, by the mobile device and using a venue accessibility map, that the estimated location is inside an inaccessible area of the venue that, according to the constraints in the venue as represented in the venue accessibility map, is inaccessible by a user of the mobile device;
   determining that, if the mobile device moved in a direction that is at a specified angle to the heading, the estimated location would not have been in the inaccessible area and would have been accessible by the user;

estimating a corrected in-venue location of the mobile device, including adjusting parameters of the statistical filter by assigning more weights along the direction in estimating the in-venue location of the mobile device; and adjusting, for a next iteration of in-venue location estimation, the heading of the mobile device by an amount that is less than the specified angle.

2. The method of claim 1, wherein the statistical filter is a particle filter for estimating a location by filtering particles, each particle being a candidate location of the mobile device in the venue.

3. The method of claim 2, wherein adjusting the statistical filter parameters comprises selecting candidate locations along the direction for filtering in the next iteration of in-venue location estimation.

4. The method of claim 1, wherein the venue accessibility map comprises a digital map of the constraints in the venue and a grid overlaid on the digital map, the grid having a plurality of cells each indicating whether a portion of the venue overlaid by the cell is accessible or inaccessible.

5. The method of claim 1, wherein the specified angle is substantially a right angle that has a sign indicating whether the direction is clockwise or counter-clockwise of the heading.

6. The method of claim 5, comprising adjusting the heading of the mobile device by an amount that has the same sign as the specified angle.

7. The method of claim 1, comprising presenting the corrected in-venue location for display on the mobile device.

8. A mobile device, comprising:
one or more processors; and
a non-transitory computer-readable medium storing instructions that, when executed by the one or more processors, cause the one or more processors to perform operations comprising:
determining an in-venue location and a heading, the in-venue location being an estimated location of the mobile device inside of a venue that is accessible by a pedestrian and that includes constraints limiting movement of the pedestrian, the in-venue location being estimated using a statistical filter of the mobile device, the being estimated based on one or more motion sensor readings of the mobile device;
determining using a venue accessibility map, that the estimated location is inside an inaccessible area of the venue that, according to the constraints in the venue as represented in the venue accessibility map, is inaccessible by a user of the mobile device;
determining that, if the mobile device moved in a direction that is at a specified angle to the heading, the estimated location would not have been in the inaccessible area and would have been accessible by the user, the specified angle having a sign indicating whether the direction is clockwise or counter clockwise from the heading; and
estimating a corrected in-venue location of the mobile device, including adjusting parameters of the statistical filter by assigning more weights along the direction in estimating the in-venue location of the mobile device; and adjusting the heading of the mobile device by an amount that is less than the specified angle and that has the same sign as the specified angle.

9. The mobile device of claim 8, wherein the statistical filter is a particle filter for estimating a location by filtering particles, each particle being a candidate location of the mobile device in the venue.

10. The mobile device of claim 9, wherein adjusting the statistical filter parameters comprises selecting candidate locations along the direction for filtering in a next iteration of location estimation.

11. The mobile device of claim 8, wherein the venue accessibility map comprises a digital map of the constraints in the venue and a grid overlaid on the digital map, the grid having a plurality of cells each indicating whether a portion of the venue overlaid by the cell is accessible or inaccessible.

12. The mobile device of claim 8, wherein the specified angle is substantially a right angle.

13. The mobile device of claim 8, comprising presenting the corrected in-venue location for display on the mobile device.

14. A non-transitory computer-readable medium storing instructions that, when executed by one or more processors of a mobile device, cause the one or more processors to perform operations comprising:
determining an in-venue location and a heading, the in-venue location being an estimated location of the mobile device inside of a venue that is accessible by a pedestrian and that includes constraints limiting movement of the pedestrian, the in-venue location being estimated using a statistical filter of the mobile device, the heading being estimated based on one or more motion sensor readings of the mobile device;
determining using a venue accessibility map, that the estimated location is inside an inaccessible area of the venue that, according to the constraints in the venue as represented in the venue accessibility map, is inaccessible by a user of the mobile device;
determining that, if the mobile device moved in a direction that is at a specified angle to the heading, the estimated location would not have been in the inaccessible area and would have been accessible by the user;
estimating a corrected in-venue location of the mobile device, including adjusting parameters of the statistical filter by assigning more weights along the direction in estimating the in-venue location of the mobile device; and
adjusting, for a next iteration of in-venue location estimation, the heading of the mobile device by an amount that is less than the specified angle.

15. The non-transitory computer-readable medium of claim 14, wherein the statistical filter is a particle filter for estimating a location by filtering particles, each particle being a candidate location of the mobile device in the venue.

16. The non-transitory computer-readable medium of claim 15, wherein adjusting the statistical filter parameters comprises selecting candidate locations along the direction for filtering in the next iteration of in-venue location estimation.

* * * * *